Figure 1:
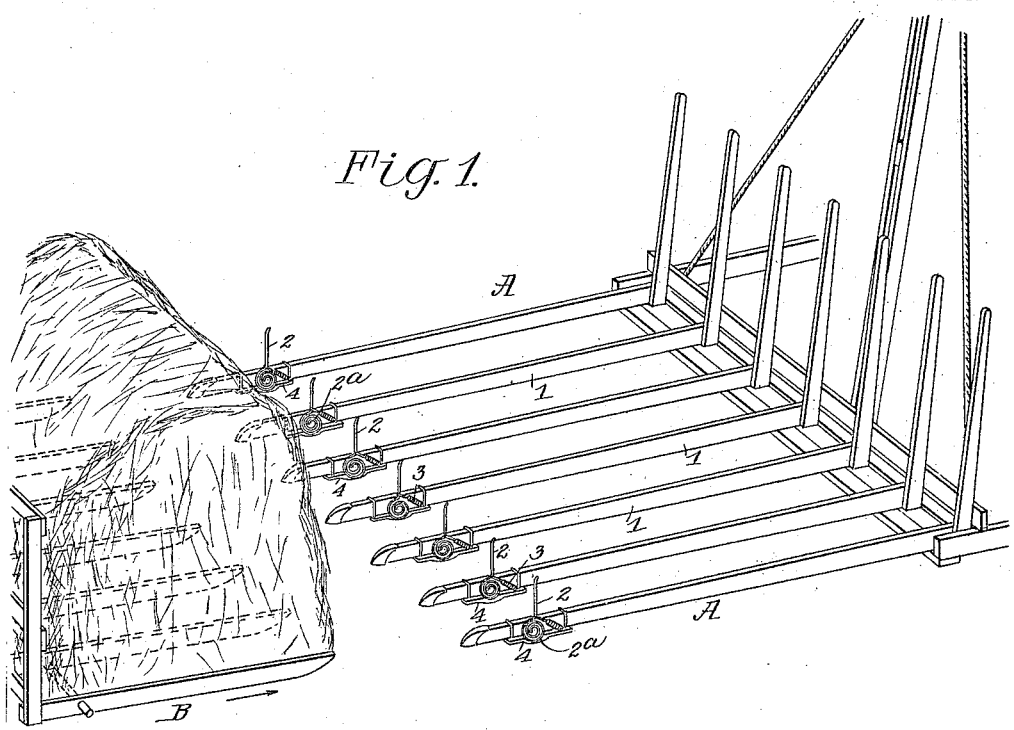

J. O. McCREERY.
HAY RETAINING DEVICE FOR HAY STACKERS.
APPLICATION FILED APR. 23, 1910.

983,156.

Patented Jan. 31, 1911.

2 SHEETS—SHEET 1.

WITNESSES:
Samuel E. Wade
Amos W Hart

INVENTOR
JESSE O. McCREERY,
BY
ATTORNEYS

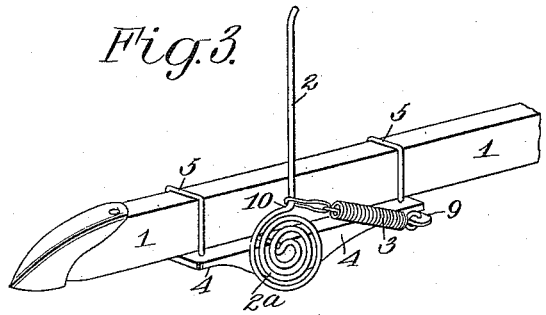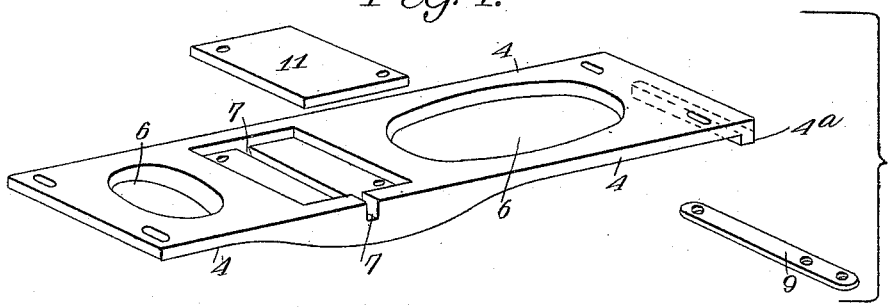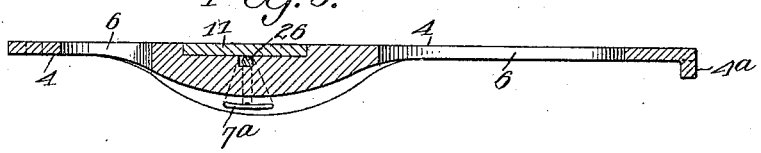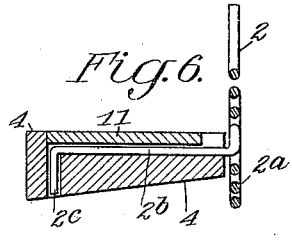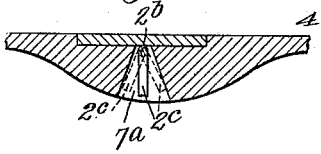

UNITED STATES PATENT OFFICE.

JESSE O. McCREERY, OF DENVER, COLORADO.

HAY-RETAINING DEVICE FOR HAY-STACKERS.

983,156.

Specification of Letters Patent. Patented Jan. 31, 1911.

Application filed April 23, 1910. Serial No. 557,111.

*To all whom it may concern:*

Be it known that I, JESSE O. McCREERY, a citizen of the United States, and a resident of Denver, in the county of Denver and State of Colorado, have invented certain Improvements in Hay-Retaining Devices for Hay-Stackers, of which the following is a specification.

My invention is an improvement in that class of apparatus employed for stacking hay, and consisting of a series of parallel teeth rigidly attached to a cross bar constituting the head of the frame and which is adapted to slide on the ground. All or several of the said teeth are provided near the front free end with a pivoted spring-retracted finger which is adapted to take into the hay and hold it on the teeth of the stacker frame while the latter is being operated for dumping the hay on the stack.

In practice, the stacker is staked to the ground at the point where a stack is to be formed, and the "bull" rake carries the hay onto the stacker. In other words, the "bull" rake travels over the stacker until the axle on which it is supported comes in contact with the spring fingers secured to the stacker teeth, and then the "bull" rake is backed or hauled off, leaving the hay on the stacker, which is then swung up in a vertical plane in order to dump the load.

My invention is embodied in the construction and combination of parts hereinafter described and illustrated in the drawings, in which:—

Figure 2:
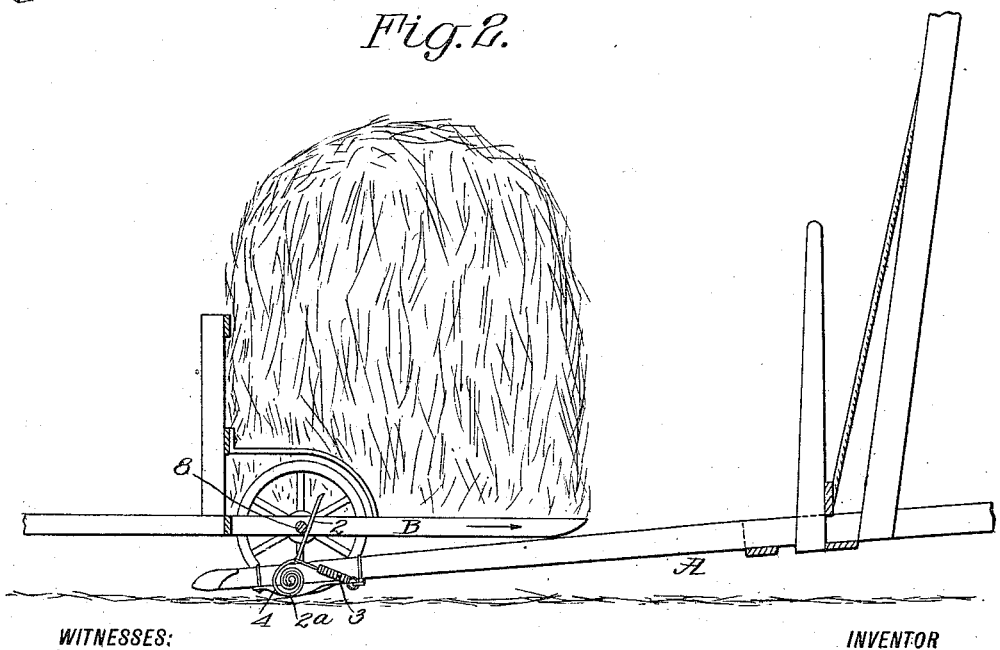

Figure 1 is a perspective view of a stacker provided with my improvement and a portion of a rake upon which hay is supported. Fig. 2 is a side view of the same parts, showing the stacker projected under the rake. Fig. 3 is a perspective view of one of the teeth of the stacker provided with my improved attachment. Fig. 4 is a perspective view of the parts composing the plate to which the spring finger is attached. Fig. 5 is a longitudinal section of the plate and finger, and Figs. 6 and 7 are cross sections of the same.

In Figs. 1 and 2, A indicates a stacker and B, the so-called "bull" or sweep rake. The hay is taken up on the latter in the usual way, and the rake B is then run over the stacker, as shown in Fig. 2, the spring fingers of the latter in such case projecting upward between the teeth of the rake and taking into the hay resting thereon, so that when the rake is retracted, the hay is taken off the rake and held on the stacker.

As shown best in Fig. 3, my improved attachment is applied to as many of the parallel teeth 1 of the stacker A as required. The attachment comprises a spring finger 2, having a coil $2^a$, a supplemental spring 3, and an oblong, rectangular, metal plate 4 on which the finger 2 is pivoted and supported. The said plate 4 is secured adjustably to a bar 1 by means of U-shaped clips or staples 5. This construction permits the attachment to be shifted, as a whole, toward or from the point of the bar 1 and clamped in any place to which it may be adjusted, as may be required.

As shown in Figs. 4 and 5, the plate 4 has a swell on the under side for the purpose of strengthening it longitudinally, and is cut out at 6 to lessen its weight. The finger 2 has a horizontal shank $2^b$, which, as shown in Fig. 6, is bent downward at its free end $2^c$. Thus, the finger proper 2 and its dependent end $2^c$ are in the same plane. The body portion $2^b$ constitutes the pivot of the finger and rests in a transverse groove 7 formed in the body of the plate 4, which is open at one end, as indicated in Fig. 4. This groove 7 is narrow except at the end where the downwardly bent portion $2^c$ of the finger is arranged. In other words, as shown in Fig. 7, the groove 7 is enlarged at the inner end $7^a$, so that the downwardly bent end $2^c$ of the finger is free to vibrate within certain limits which are indicated by dotted lines—Fig. 7. The convolutions of the coil $2^a$ of the finger 2 are separated from each other by a uniform distance, and thus do not come in contact when the upwardly projecting portion of the finger is subjected to pressure.

It will now be understood that when the "bull" rake carrying hay is run up over the stacker, as shown in Fig. 2, the fingers 2 will be thrown backward to the extent permitted by the enlargement $7^a$ of the groove 7, without subjecting the finger or its coil to any appreciable strain. This backward throw, as shown in Fig. 1, is caused by contact of the finger with the axle 8 of the rake. When the "bull" rake is backed off, the fingers 2 take into the hay thereon and at this time the supplemental spring 3 comes into action and resists the tendency of the spring finger to spring backward. The said supplemental spring is attached at one end to a bar 9 which extends across beneath the rear end of the clamping plate 4 and lies in contact with a downwardly projecting flange or lip $4^a$ of the same. The bar may be secured by the same clip or staple which secures that end of the plate 4. The other or forward end of the spring 3 is engaged with the finger 2 at its outer bend 10. The spring is put under tension when the finger engages the hay in the retracting movement of the "bull" rake B, and resists the backward movement of the finger so that it is held in engagement with the hay in such manner as to greatly facilitate the removal of the hay from the rake. Without the aid of the supplemental spring 3, the finger 2 would be thrown over so far as to slide more or less in contact with the hay, and then fail to take a firm hold therein and to remove it from the rake in the desired manner.

It will be observed that the spring 3 is not subjected to appreciable tension until the finger has rocked back to the farthest position permitted by its downwardly bent portion $2^c$, but that at this juncture, the normal resistance of the finger coil $2^a$ is supplemented by the tension of the spring 3. Thus, it will be seen that the spring finger is practically loose within certain limits of vibration, and that the second spring, while it greatly increases the tension of the finger at a required time, leaves it practically free at all other times. It will be further seen that, when the rake is run on the stacker, as shown in Fig. 2, and the fingers 2 come in contact with the axle 8, there is practically no resistance by the fingers, whereas in other inventions of this class, the aggregate resistance offered by the several fingers is so considerable as to be very objectionable. As shown, the upper end of the finger is preferably curved backward to facilitate its hold in the hay.

As indicated in Fig. 6, the coil $2^a$ of the finger is held away from and out of contact with the plate 4 by means of the downwardly bent portion $2^c$ which may be in contact with the rear wall of the groove 7. The coil is in the same vertical plane with the finger proper 2, and hence the coil is compressed or wound upon itself in the operation of the finger. Besides, in this position, the coil occupies minimum space horizontally, which is of considerable importance in devices of this class.

In order to permit convenient attachment and detachment of the finger 2, the clamping plate 4 is provided with a rectangular recess in its upper side or face, and a plate 11 of corresponding shape is secured therein and thus covers the body $2^b$ of the finger.

What I claim is:—

1. The combination, with a stacker tooth, of a hay-retaining attachment comprising a clamp secured to the tooth, a spring finger projecting above the tooth and its lower portion formed as a coil which is arranged vertically and in the same plane with the finger and thus parallel to the side of the tooth, the coil having a shank extending laterally and supported on the clamp, and means for limiting the rotation of such shank on its axis, as shown and described.

2. The combination with a stacker tooth, of the attachment herein described comprising a metal plate having a transverse groove terminating at one end in a vertical portion enlarged from the top downward transversely, and a hay-retaining spring finger, whose body portion or shank end lies in the said groove and its inner terminal portion projects downward and is adapted to vibrate in the enlarged portion of the groove, substantially as described.

3. The combination with a stacker tooth, of a hay-retaining attachment comprising a plate adapted to be secured to said tooth, a hay-retaining spring finger held and supported on said plate, and a supplemental spring connected with the rear portion of the plate and with the finger adjacent to its lower portion, whereby when the finger is subjected to pressure, the supplemental spring is put under tension, substantially as described.

4. An attachment for hay-stackers of the class indicated, comprising an adjustable clamp device secured to a stacker tooth, a spring finger having a coil and a horizontal body portion by which it is supported on the clamp, and a supplemental spring connected with such finger adjacent to its spring coil and extending rearward to a fixed point of attachment, substantially as described.

5. The combination with a stacker tooth, of a plate 4 secured to the under side of the same and having a recess in its upper portion and a transverse groove in the bottom of said recess, said groove leading out at the side of the plate 4, a spring hay-retaining finger extended vertically above the tooth and having a lateral shank arranged at a right angle and adapted to lie loosely in the aforesaid groove, means for limiting rotation of the finger, and a detachable plate 11 adapted to fit and be secured in the aforesaid recess, thus overlying the shank of the finger, as shown and described.

6. An attachment for hay-stackers of the class indicated, comprising an adjustable clamp adapted to be secured to a stacker-tooth, a spring finger projecting vertically from the clamp and having a base coil arranged in the same plane with itself and provided with a horizontal extension or shank which serves as a supporting journal for the coil and finger proper, and a supplemental spring connected with said finger above and adjacent to its coil and extended rearward and secured at a fixed point, as shown and described.

JESSE O. McCREERY.

Witnesses:
W. R. DAVIS,
J. L. ODELL.